United States Patent [19]
Cabrera et al.

[11] Patent Number: 5,802,599
[45] Date of Patent: Sep. 1, 1998

[54] SYSTEM AND METHOD FOR ALLOCATING STORAGE IN A FRAGMENTED STORAGE SPACE

[75] Inventors: Luis Felipe Cabrera; Robert M. Rees, both of San Jose, Calif.

[73] Assignee: International Business Machines Corporation, Armonk, N.Y.

[21] Appl. No.: 688,065

[22] Filed: Jul. 30, 1996

Related U.S. Application Data

[63] Continuation of Ser. No. 193,323, Feb. 8, 1994, abandoned.

[51] Int. Cl.$^6$ ............................. G06F 12/00; G06F 13/00
[52] U.S. Cl. ............................. 711/170; 364/DIG. 1; 364/DIG. 2; 364/246; 295/621; 295/622; 711/100; 711/147
[58] Field of Search ............ 364/DIG. 1, DIG. 2, 364/246; 395/427, 497.01, 474, 621, 622; 711/100, 170, 147

[56] References Cited

U.S. PATENT DOCUMENTS

| | | | |
|---|---|---|---|
| 4,758,944 | 7/1988 | Bartley et al. | 395/425 |
| 5,034,914 | 7/1991 | Osterlund | 395/425 |
| 5,155,830 | 10/1992 | Kurashige | 395/844 |
| 5,276,840 | 1/1994 | Yu | 395/855 |
| 5,375,233 | 12/1994 | Kimber et al. | 395/600 |
| 5,384,669 | 1/1995 | Dunn et al. | 360/48 |
| 5,394,534 | 2/1995 | Kalakowski | 395/439 |
| 5,454,103 | 9/1995 | Coverston et al. | 395/600 |
| 5,479,656 | 12/1995 | Rawlings | 395/497.02 |

OTHER PUBLICATIONS

Method for Allocating Computer Disk Space to a File of Known Size, IBM Technical Disclosure Bulletin vol. 27 No. 10B Mar. 1985, R. M. Bryant and P. A. Franaszek.

M. G. Baker et al., "Measurements of a Distributed File System", Proceedings of the 13th SOSP, Nov. 1987, pp. 198–211.

R. van Renesse et al, "The Design of a High–Performance File Server", Proceedings of the 9th International Conference on Distributed Data Systems, IEEE, (1989), pp. 22–27.

R. Hagmann, "Reimplementing the Cedar File System Using Logging and Group Commit", Proceedings of the 11th SOSP, Operating Systems Review, vol. 17, pp. 155–162.

M. D. Schroeder et al, "A Caching File system For a Programmer's Workstation", Proceedings of the 10th SOSP, Orcas Island, Washington, 1985, pp. 25–34.

M. N. Nelson et al, "Caching in the Sprite Network File System", ACM Transactions on Computers, Feb. 1988, pp. 134–154.

M. E. Powell, "The Demos File System", Proceedings of the 6th SOSP, Operating Systems Review, vol. 11, No. 5, Nov. 1977, pp. 33–42.

M. McKusick et al., "A Fast File system for UNIX", ACM Transactions on Computer Systems, vol. 2, No. 3, Aug. 1984, pp. 181–197.

*Primary Examiner*—Tod R. Swann
*Assistant Examiner*—Tuan V. Thai
*Attorney, Agent, or Firm*—Esther E. Klein

[57] ABSTRACT

This invention provides a one-pass storage process to manage storage space in a storage hierarchy system wherein whole objects or fragments of whole objects can be retrieved efficiently. Metadata to represent appropriate geometric characteristics of storage devices, units of transfer to minimize retrieval time, and buffers, are used to control the storage allocation. A plurality of objects from an object set are aggregated into at least one object grouping for storage where the object grouping is smaller than a minimum storage size. For each object grouping and each object not in an object grouping, a determination is made of the total number of blocks of storage needed and a minimum transfer size. Extents of blocks are identified in the storage device of a size greater than the minimum transfer size totalling the total number of blocks of storage needed.

15 Claims, 4 Drawing Sheets

SYSTEM AND METHOD FOR ALLOCATING STORAGE IN A FRAGMENTED STORAGE SPACE

This is a file wrapper continuation application of Ser. No. 08/193,323 filed Feb. 8, 1994, now abandoned.

TECHNICAL FIELD

The present invention relates to the field of computerized storage management, and, more particularly, to methods and systems for allocating storage space for a set of data objects that supports the efficient storage and retrieval of the objects while minimizing space fragmentation in the storage device.

BACKGROUND OF THE INVENTION

In computer systems having a central processing unit (CPU) and main volatile memory, data objects are stored in nonvolatile storage devices that are in communication with the CPU and main memory. There are a wide range of storage device media that are currently available including magnetic direct access storage devices (DASD), optical devices and magnetic tape libraries.

Storage management systems are used to manage the efficient storage and retrieval of electronically stored data object instances in the storage media devices. Storage management systems are used, for example, by database management systems, the storage subsystem of a file system, and a storage hierarchy subsystem. The storage management system uses either complete objects as the unit of storage and retrieval or uses a predetermined storage transfer unit.

In a distributed client-server environment, a storage management system comprises a server running a storage management process which accepts objects for storage from a plurality of heterogeneous clients. Requests to store, retrieve and delete sets of objects in a single client-server interaction may originate from more than one client in a heterogeneous collection of clients.

Each media instance is topically subdivided into equal length units of data transfer called blocks in order to administer the object storage. A block is the smallest unit of space allocation. The smallest possible unit of storage and retrieval is called a sector. A block is implemented as an integer number of sectors. It is desirable that a block be read and written at the highest possible speed supported by the device. Some devices require hardware repositioning when writing or retrieving data. For example, the head of a magnetic disk may have to be moved to a different location on the disk while retrieving a data object. However, once a sector begins to be read or written, it does not require any additional hardware repositionings. Therefore, the maximum size of a sector is constrained by the need of the underlying storage media to reposition some hardware.

A block and a sector may be substantially larger than the typical size of objects being stored in the system. The size of a sector and a block refers to the number of bytes of data that can be stored there. When different objects are never stored together in the same block, there is the potential for severe internal fragmentation. In a typical Unix system, over half of the files have a length smaller than 4 k bytes or even smaller than 1 k byte. Typical block sizes are 4 k and 8 k bytes. Sector sizes vary from ½ k to 4 k. In super-computing environments, the file sizes can be larger than in the Unix environment but a substantial fraction of the files are still smaller than 4 k bytes. In traditional relational databases, the sizes of tuples (objects for storage) will seldom exceed a few hundred bytes. Thus, internal storage fragmentation can also occur when storing database tables.

A storage management system supports random access to any portion of an object. However, it is common to retrieve an object or a set of objects sequentially as a whole. In particular, sequential access is very common in Unix file systems and is also needed to support the current trend of whole object manipulation in object-oriented systems. Ideally, the cost of retrieving an object needs to be minimized when accessed sequentially in its entirety. Therefore, the sequential access of complete objects is an important operation to optimize.

During the course of usage of a storage device, there are numerous generations of creations and deletions of objects. A consequence of the generations of creations and deletions is that the space in the storage device becomes fragmented which makes storage allocation schemes inefficient. A storage management system and process needs to address the problem of fragmentation to preserve efficiency of data retrieval.

The Workstation Data Save Facility (WDSF/VM) storage management product from the IBM Corporation provides a multi-pass process that assigns space to one object at a time. WDSF keeps track of the free allocatable blocks for a particular disk using a disk data structure known as a bit vector or bit map. The bits in a vector are numbered zero to (N−1) corresponding to the N allocatable blocks on the disk. A bit set to "1" represents an allocated disk block, while a bit set to "0" denotes a free block. The order of the bits in the vector approximate the co-locality of the physical underlying sectors on the disk. That is, adjacent bits in the vector represent, for the most part, adjacent sets of sectors on the disk.

Each new object to be stored in the system is accompanied by a size estimate variable "B" which is used to estimate the total number of blocks of disk that must be allocated to hold the object's data. In the interest of minimizing retrieval time for the entire object, an effort is made to allocate as many of the B blocks in adjacent positions on the disk as possible. In that way, the overall number of seeks needed to retrieve an object is minimized and the seek time needed to access each of the blocks that comprise the object is also minimized.

In WDSF, the space allocation function searches the bit vector for the first contiguous range of at least B bits and sets the selected bits to "1". When no contiguous range of B bits is found, then the largest free range less than B is selected instead. In order to accomplish this, the largest free range encountered in a given pass over the bit map is tracked and stored. The coordinates of the selected range are returned where the coordinates include the starting bit number and the number of bits in the range. In the case where a sufficiently large free range of storage space is not available, the allocator function searches the entire bit vector again to find the next largest appropriate free range. When no single contiguous range of free bits is found, multiple calls to the allocation function are made, which means multiple passes over the bit map. The WDSF system yields the minimum number of allocated ranges of blocks from the disk. However, as files become larger and disks become more fragmented, the cost of multiple searches of the bit vector may become more CPU intensive.

There is a need for a one-pass storage management process that by careful selection of the storage transfer unit minimizes the time to retrieve whole objects or fragments of whole objects. There is also a need that such a system exploit space allocations for sets of objects and minimize internal fragmentation of storage devices. It is important that such a system be able to handle objects of any size.

One or more of the foregoing problems is overcome and one or more of the foregoing needs is satisfied by the present invention.

SUMMARY OF THE INVENTION

A system and method provide a one-pass storage management process which uses a carefully selected storage transfer unit to minimize the time to retrieve whole objects or fragments of objects of any size and uses a dedicated buffer for aggregating sets of small objects being stored in a batch request to minimize internal fragmentation of the storage device.

Metadata is gathered and maintained to represent the appropriate geometric characteristics of the storage device. The metadata facilitates the selection of a transfer unit, which minimizes the time to store and retrieve objects to and from the storage devices. The metadata also provides information used to select the size for a buffer which controls the degree of internal fragmentation of the storage devices. The allocation of the storage space by the storage management system is performed in one pass over the base resource information. The method can be used advantageously in any level of a storage hierarchy where the geometry of data layout is a factor in the time to access and retrieve the data.

In a storage management system having a central processing unit (CPU) memory and at least one storage device where data objects are stored in a plurality of sectors called blocks on the storage device, a method is provided for allocating space on the storage device for an object set containing at least one object. A plurality of the objects from the object set are aggregated into at least one object grouping for storage where the objects in the object grouping are smaller than a minimum storage size. For each object grouping and each object not in an object grouping, the total number of blocks (storage units) of storage needed and a minimum transfer unit are determined. Extents of sectors in the storage device of a size greater than the minimum transfer unit totalling the total numbers of sectors of storage needed are identified.

In the preferred embodiment, the object groupings are aggregated by the following steps: For each object in the object set smaller than the minimum storage size, the object is stored in a buffer the size of the minimum storage size. When an object smaller than the minimum storage size will not fit in a used buffer containing one or more objects, that object is stored in a refreshed buffer. The objects in the used buffer are designated as an object grouping for storage.

In the preferred embodiment, the extents of storage sectors are identified by traversing a listing of free extent sizes once in a predetermined order to identify extent sizes greater than the minimum transfer unit until the total number of sectors of storage needed is identified or the listing ends. The listing of free extent sizes is constructed by first constructing a bit map representation of the storage sectors. Next, a linked list of extents is constructed based on the bit map representation where the linked list is used as the free extent listing without referring back to the bit map representation. The linked list is updated as sectors are used and freed.

In the preferred embodiment, the minimum storage size is determined based on the storage device and the size of object in the sets being stored.

In the preferred embodiment, the storage management system is arranged as a server satisfying requests for storage from a plurality of heterogeneous clients.

The present invention retains the object retrieval performance characteristics of the WDSF/VM process but better addresses the problem of internal fragmentation of devices, exploits requests for space for sets of objects and is less CPU intensive.

There are many benefits provided by the present invention. The use of a buffer exploits requests to store sets of objects in order to reduce internal fragmentation in storage devices. An upper bound on the time to retrieve a whole object from storage is determined which minimizes the time to retrieve an object from storage. The run time, cost and size of data objects being transferred are tailored to the capacity characteristics of individual storage devices, the operating characteristics like processing power, and the virtual memory management characteristics of the server.

A further benefit of the invention is that the size of the storage pool to be managed can be arbitrary and can be increased or reduced at any time. Also, the number of levels present in the storage hierarchy can be arbitrary, the size of the individual objects can also be arbitrary, and the size of sets of objects to be stored in a batch of requests has no limit. Additionally, data compression can be exploited at the storage server with no intervention of the client. Data encryption can be exploited at the storage server with or without the collaboration of the client. Furthermore, all the storage management functions are performed without the intervention of the clients of the system.

The present storage management system can be used in any data storage system that administers space in storage devices. The benefits are maximized when used for devices in which the time to access and retrieve an object depends on the geometry of the layout of the data of the object on the storage media. In particular, the system strives to minimize the retrieval time of objects stored in devices like magnetic disks and optical disks by minimizing the number of seeks necessary to service a retrieval request. For magnetic tapes, the system strives to minimize the number of tape repositions. The storage subsystem of any object storage system can use this system. In particular, backup and restore systems, database management systems, file systems, image storage systems, facsimile storage systems, video storage systems and the front ends of any storage hierarchy subsystem can benefit from the use of this storage management system.

DETAILED DESCRIPTION OF THE INVENTION

The detailed description of the preferred embodiment of the invention will be described as implemented in the hierarchical client-server system shown in FIG. 1. The invention specification may be implemented using standard programming and/or engineering techniques. The resulting program or programs may be stored on disk, diskettes, memory cards, ROM or any other memory device. For execution, the program may be copied into the RAM of a storage system. One skilled in the art of computer science will easily be able to combine the software as described with appropriate general purpose or special purpose computer hardware to create a computer system embodying the invention.

The storage hierarchy system comprises a server 10 which runs the storage management process. The server comprises a central processing unit (CPU) 12 and memory 14 in communication with one or more non-volatile storage devices 16 arranged in a hierarchy, including magnetic disks, optical disks, optical jukeboxes and tape jukeboxes.

The server is in communication with a heterogeneous collection of clients 20 which make requests to store, retrieve and delete sets of one or more objects in individual client server transactions.

Objects are stored in storage media instances. The media instances are subdivided into equal length units of data transfer called blocks. A block is the smallest unit of space allocation and storage retrieval. The server uses the CPU and memory capabilities to run the process for storing data in the storage devices.

The storage management system supports random access to any portion of an object, and the process strives to minimize the cost of retrieving an object when accessed sequentially in its entirety. When storing a complete object, the storage service is given the uncompressed length of the object.

Figure 1:
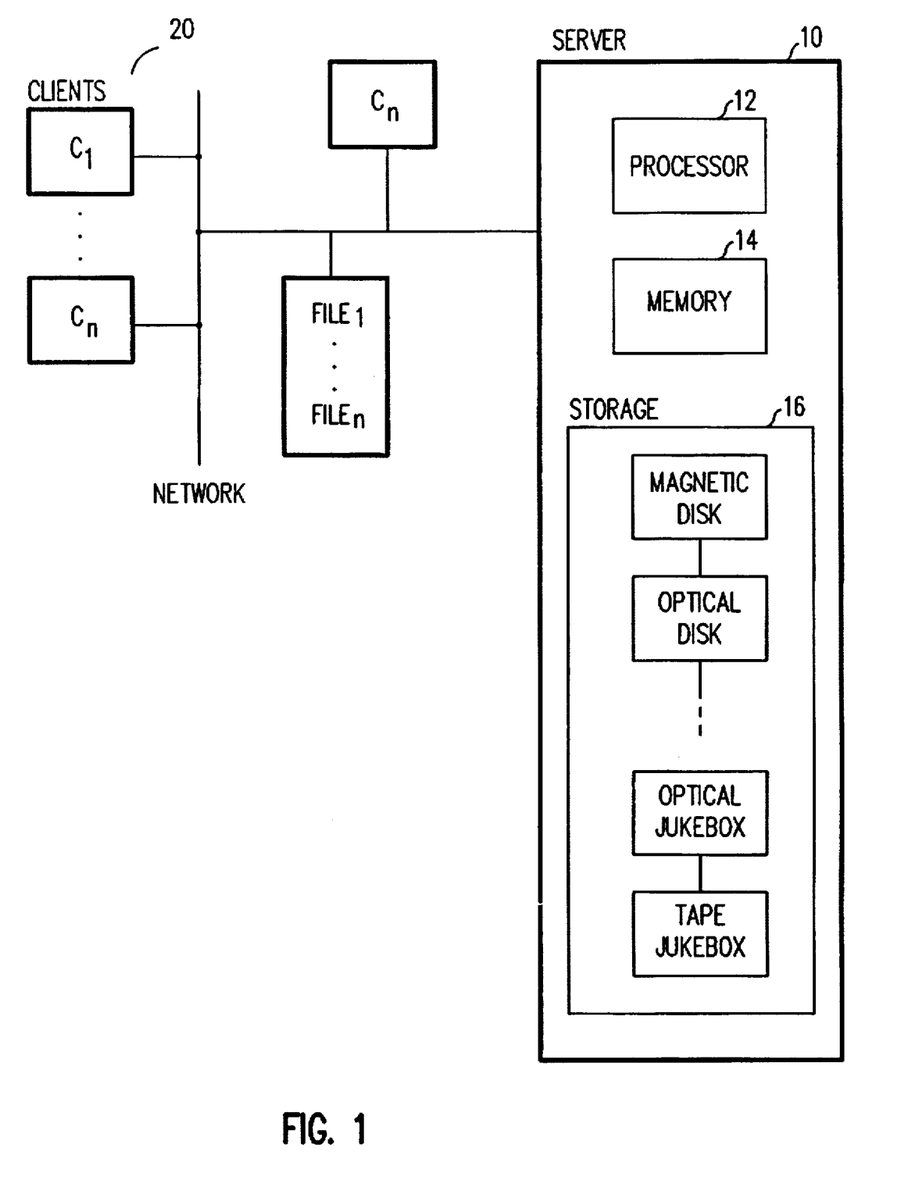
FIG. 1 is a block diagram of the components of the storage hierarchy system utilizing the invention.

There are many variations of the computer system shown in FIG. 1 known to those skilled in the art for providing the storage allocation system of the present invention.

Figure 2:
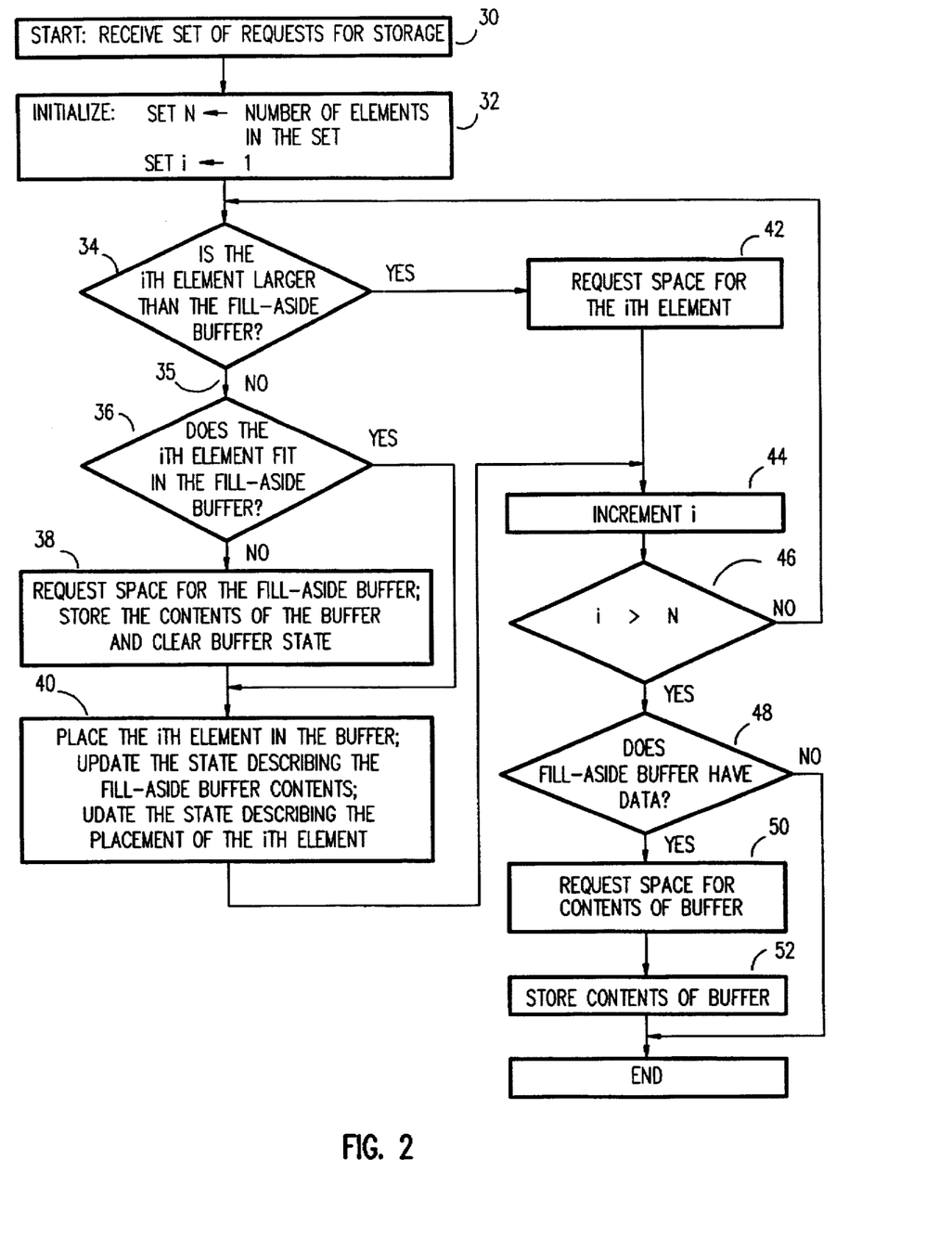
FIG. 2 is a flowchart of the preferred process for grouping together small objects.
Figure 4:
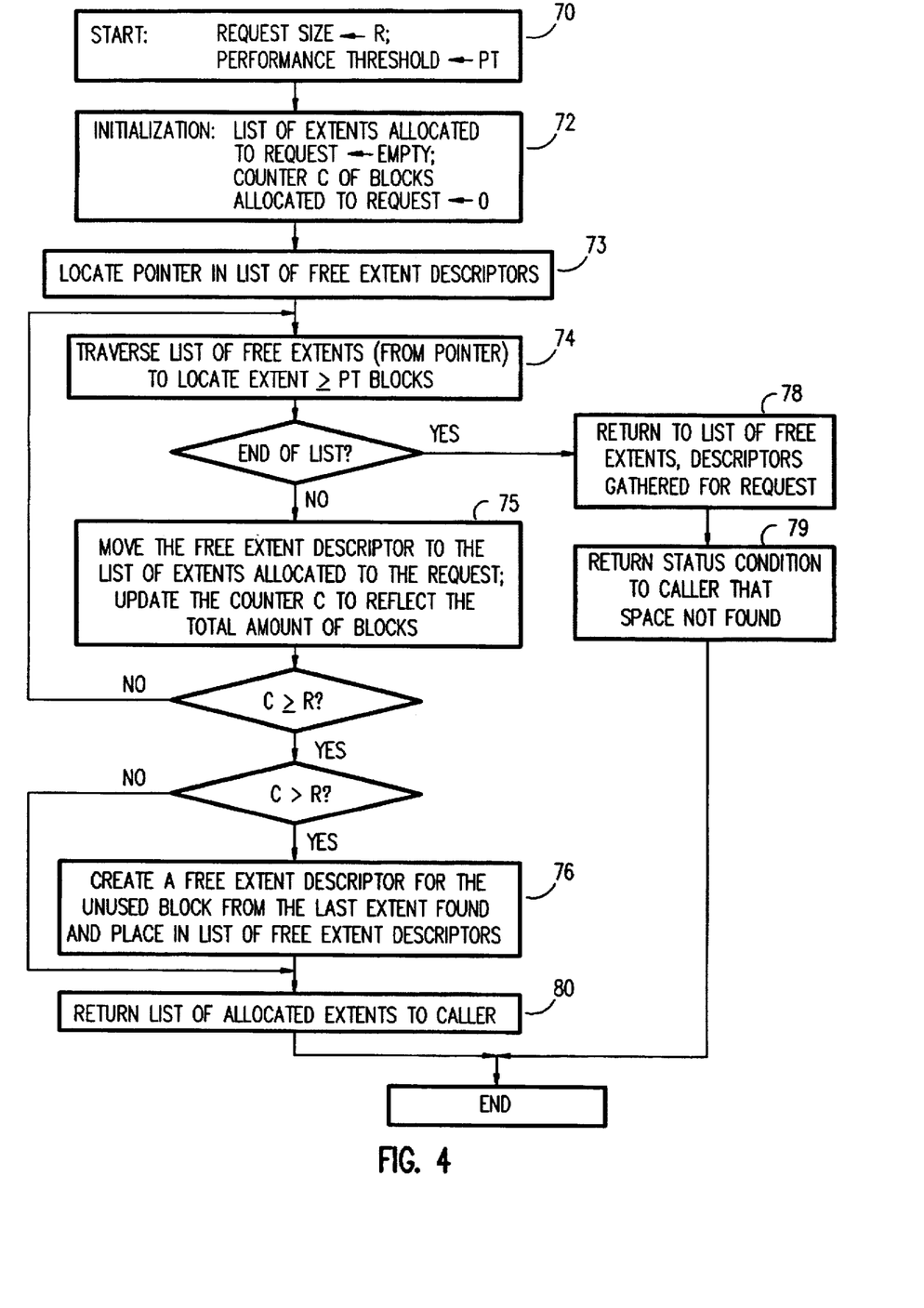
FIG. 4 is a flowchart of a process for identifying extents of storage.

Referring to FIGS. 2 and 4, flowcharts of the preferred embodiment of the storage allocation process are illustrated. FIG. 2 provides the preferred process for aggregating objects smaller than a minimum storage size into an object set, and FIG. 4 provides the preferred process for identifying a set of one or more extents of sectors greater than a minimum transfer size in a storage device.

The interface to the storage allocation process takes the following parameters as input: (1) number of blocks being requested for each object, (2) buffer of the allocator, (3) storage transfer unit (also referred to as a storage allocation threshold) of the underlying device, and (4) the extent data structure for the underlying device. The output of the process returns a stack of references to "0" or more block extents. Each block extent is larger than or equal to the minimum storage transfer unit of the underlying device. When no block extents are returned, that indicates that the request could not be satisfied. Otherwise, the total number of blocks returned in the stack by the allocator is exactly the number of blocks requested by the requester of the allocation process (client). The number of block extents returned in the stack determines the upper bound on the number of repositionings that the hardware will incur while retrieving the object for which the space has been allocated.

Referring to FIG. 2, the storage allocation process receives a request to store a set of objects from a client of the storage allocation system 30. Variables used in the process are initialized 32, including setting a variable "N" to be the number of elements in the object set and setting a variable "I" to have the initial value "1".

The storage management system first tries to store each object in the set in a dedicated buffer referred to as a "fill aside buffer". A determination is made as to whether the ith element of the set is larger than the fill aside buffer 34. When the ith element is not larger than the size of the fill aside buffer 35, a determination is made as to whether the ith element would fit in the fill aside buffer 36. When the ith element is smaller than the fill aside buffer but does not fit in the fill aside buffer, a request for additional space for the fill aside buffer is made, a storage request is made to store the objects that are currently in the buffer in a storage device, and the buffer is cleared 38. A new fill aside buffer may be requested. The empty buffer begins to be filled with this last object.

When an object fits in the fill aside buffer either because a new fill aside buffer has been made or there is room for in the existing one, the object is placed in the buffer. A description of the fill aside buffer is also updated to reflect the addition of the object to the buffer, and information regarding that object in the set is also updated to describe the placement of that object in the buffer 40.

For objects that are not to be stored in the fill aside buffer because they are larger than the fill aside buffer, a request for the total number of sectors needed for storage is made 42.

When an attempt is successfully made to obtain the requested sectors from the storage device, the object is stored in the storage device. If at any point in satisfying a request to store a set of objects, the allocator cannot satisfy the storage demands for the required sectors, the operation stops. An indication is returned to the client of the status of the process so that the client is informed which objects were stored by the system and which were not.

The process continues for each object in the object set by incrementing the pointer I to point to to the next object 44 until I has been incremented to be greater than the number of objects in the set 46. After all the objects have been processed for storage in the buffer or directly in the storage device, a determination is made of whether the fill aside buffer has any objects in it. When there are any objects remaining in the buffer 48, a request is made for the required space to store those objects 50. When that space is available, the objects are stored on the storage device 52.

Figure 3:
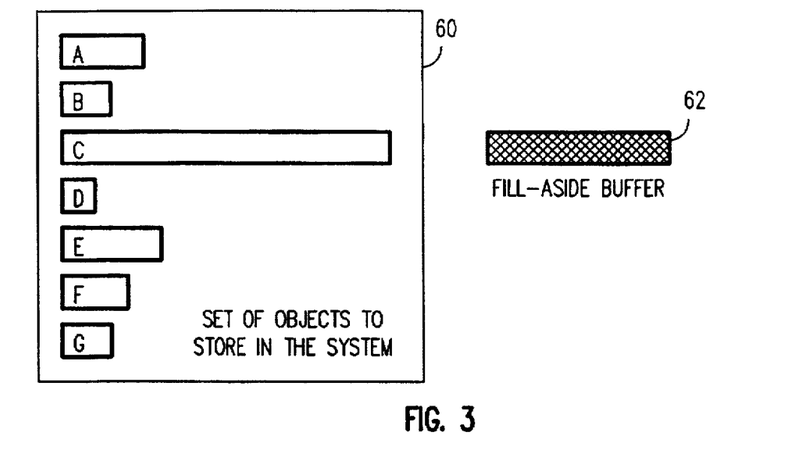
FIG. 3 is an example of a set of objects to be stored and of a dedicated buffer for grouping together small objects.

An example of a set of objects 60 to be stored and a dedicated fill aside buffer 62 are shown in FIG. 3. A set of seven objects labelled sequentially A through G have varying sizes as compared to the fill aside buffer. Six of the objects are smaller than the buffer. In this example, the system first stores object A in the fill aside buffer. Next, object B is also stored in the fill aside buffer. Object C, being larger than the fill aside buffer, is to be stored directly in the storage device. A request is made for a sufficient number of blocks to store object C. After object C is processed, object D is stored in the fill aside buffer as it is also able to fit in the buffer still containing objects A and B. Object E, while smaller than the fill aside buffer, is not able to fit in the fill aside buffer with objects A, B and D already stored in it. Therefore, the system makes a request for sufficient blocks to store all of the objects in the fill aside buffer as one object grouping. After the fill aside buffer is cleared, object E is placed in the buffer. Objects F and G are processed accordingly by being placed in the fill aside when possible. After all the objects in the object set request have been processed, any objects remaining in the fill aside buffer are stored in the storage device, if the space is available.

The storage management process uses advantageously multi-object requests to minimize internal fragmentation. It uses the fill aside buffer for this purpose. The larger the set of objects that the client wants stored, the better for the server, as there are more opportunities for improved storage packing. In the example in FIG. 3 of the bit map, only three allocation requests are made to the server to store the eight objects in the set submitted by the client. The internal fragmentation is likely to be substantially less than if the objects were stored individually.

In the preferred embodiment, a size threshold such as a storage transfer unit can be used to exert a finer control on internal fragmentation. This transfer unit, smaller than the size of the fill aside buffer, would be used to decide if an object is to be placed in the fill aside buffer and if an additional look ahead in the list is to be performed so that the buffer can be more accurately and precisely filled without having gaps. For example, for the objects shown in FIG. 3, if after objects A, E and F were in the buffer, object D would also fit but not object B. An effort could be made to identify this situation and insert object D rather than trying to insert object B, which would trigger the buffer being stored.

The data can be compressed and/or encrypted when being placed in the fill aside buffer or when being placed in its final set of buffers. The effect of the compression and/or encryption is transparent at the server. After compressing and/or encrypting the data, the system may end up needing less space resources than those originally requested.

In the preferred embodiment, the size of the fill aside buffer (the minimum storage size) is a multiple of the size of a sector in the underlying device. The buffer is used by the storage allocation process when processing allocation requests. The fill aside buffer provides a mechanism to reduce internal fragmentation and thus to maximize the storage utilization of the device.

For requests to store a set of objects, those objects that are larger, after compression and possibly encryption, than the fill aside buffer are stored directly into a buffer that represents newly allocated blocks in the storage media. For objects that are smaller than the fill aside buffer, the process tries to store them first in the fill aside buffer. The system allocate blocks to store the objects in the fill aside buffer and assign a new buffer only when storing the next object in the fill aside buffer would overflow the fill aside.

The storage management process supports owner isolation by only placing in the fill aside buffer objects that belong to the same user. Thus, at any given time, the system has one fill aside buffer per user request being serviced. The fill aside buffer allows the exploitation of batches of requests where objects in an object set are likely to be stored and retrieved together to minimize internal fragmentation. The overhead cost involved in this process is the storage of the data structure to hold the additional metadata that specifies for those objects that share a sector, where in the sector an object begins and its length.

Preferably, the size of the fill aside buffer is to be an integer multiple of the block size. In a typical Unix installation, the fill aside buffer could be 8 k bytes. In a preferred embodiment, the fill aside buffer size is determined heuristically considering two factors. The first factor is the distribution of sizes of entities or objects to be stored, and the second factor is the distribution of sizes of the sets of entities or objects to be stored. The aim of the fill aside buffer is to reduce internal fragmentation. Therefore, the safest value to use as the size of the fill aside buffer is one block.

However, if all the entities are large or the sets of the entities are larger than a sector, the size of the fill aside buffer can be chosen to be a small multiple of the block size without much risk of having excessive internal fragmentation. Examples of multiples of the block size could be two to 16 times the block size.

Referring to FIG. 4, a flowchart is shown of the preferred embodiment for identifying extents of blocks greater than a minimum transfer unit in order to satisfy an allocation request. The requester provides the object size and a performance threshold value is determined as a minimum transfer unit 70. Only block extents of a value or size at least the size of the threshold are returned. An initialization process involves setting a list of extents allocated representing the space available (tentative return stack) to empty and a counter C of a running sum of the number of blocks allocated to the request to "0". A base pointer is set to the first element in a list of free extent descriptors 73. The extent list is traversed at most once, and a tentative return stack is built until all the space needed has been found. The list of free blocks is traversed to find extents greater than the threshold size of blocks 74. When an extent in the structure is at least the size of the threshold, it is used; and, then, the number of blocks that still need to be allocated for this request is updated 75. When the number of blocks allocated exceeds the amount requested, the last extent of blocks just allocated is divided according to what is needed, the free amount is returned to the structure, and an indication is made that no more block extents are needed 76. The fact that more blocks were found than needed can be expressed with a negative number of blocks needed to be allocated. When the end of the structure is reached in the traversal process without having found the necessary number of blocks, then those blocks that had been set aside for allocation are returned to the structure 78. The blocks are moved from the tentative return stack and returned to the structure. An indication is made to the requester that not enough extents were located by returning an empty stack 79. When enough are found, then the non-empty stack of extents of blocks are returned 80. The storage management process traverses at most once the extent data structure when trying to service a request for M blocks 86. At the end of this traversal, the storage management process either has succeeded or failed in servicing the allocation request.

The list of free extent descriptors is derived from the sectors that are free in the storage device, as initially described in a bit map representation.

Figure 5:
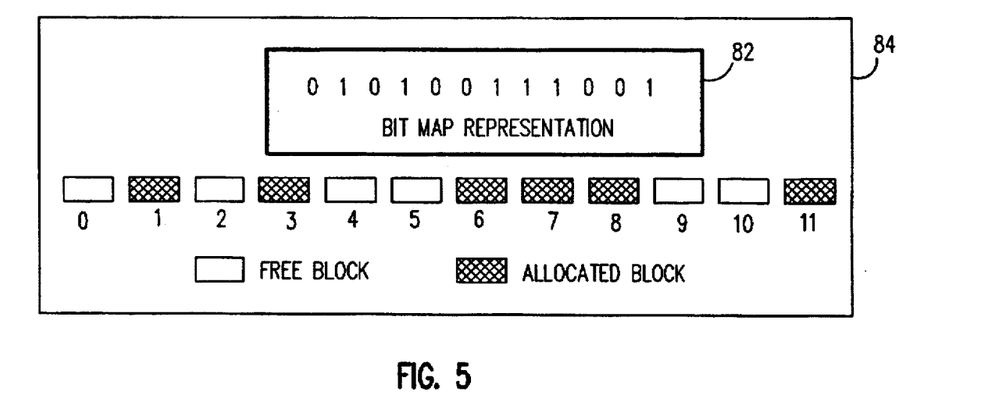
FIG. 5 is an illustration of bit map representation of a storage device.

Each storage media instance present in the storage subsystem is represented by a bit map. Each sector is represented by one bit in the bit map. A bit set to "1" represents an allocated sectors and a bit set to "0" represents a free sector. FIG. 5 provides an illustration of a bit map 82 representing a storage media instance with twelve sectors 84.

The array of allocation bits also captures the spatial characteristics of the storage media. Blocks whose underlying sectors are spatially close to each other are represented close to each other in the array of bits. For example, in the case of magnetic disks and of optical disks, two adjacent bits in the array either represent two blocks that can be retrieved without moving the disk head or two blocks that are one track removed from each other.

In the example in FIG. 5, six of the twelve blocks are allocated where the first (0) and third (2) blocks are extents of one free block and the fifth (4) and tenth (9) blocks each begin extents of two free sectors. For a given storage media instance, the larger the size of the block, the shorter the allocation bit map. For example, if the block has a size of 8 k bytes, then the size of the bit map is one half the size of the bit map when the block has a size of 4 k bytes.

When trying to service a request to allocate M blocks, it is desirable to avoid examining the bits of the allocation and bit map described above. Implementing bit map manipulation operations is not as efficient as implementing word manipulation operations. A bit map requires the bit-by-bit examination of each element in the bit map. It is more efficient to provide a data structure that represents concisely contiguous set of free blocks in the storage media (extents). This structure is called an extent data structure because sets of contiguous blocks that are free are logically represented by a pair of numbers. The first number in the pair is the position in the bit map array of the first bit representing a free block preceded by allocated sectors. The second number is the number of contiguous free blocks.

For the example illustrated in FIG. 5, the corresponding list of free extents would have four elements describing free sectors beginning in the sectors 0, 2, 4 and 9. An ordered pair representation of this data is: (0,1), (2,1), (4,2) and (9,2).

Figure 6:
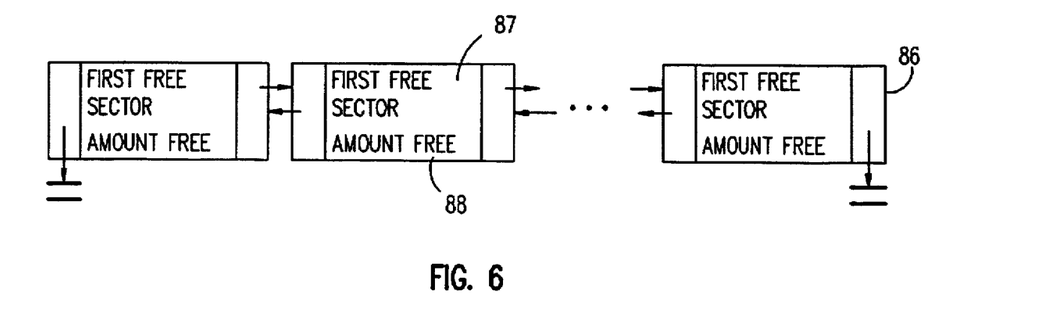
FIG. 6 is an illustration of a doubly linked list arrangement of the list of storage extents.

The extent data structure represents an empty storage media instance by just one entry, namely an ordered pair (0, total number of blocks in the storage media instance). If all blocks up to a given one are allocated, then all the entries in the structure have a value in their first component larger than that bit (the S bit in the base bit map). When all blocks from a given one are free, then all the entries in the structure have a value of their first component smaller than that bit (the S bit in the base bit map). Therefore, the storage reclamation policies that cluster the ranges of assigned blocks minimize the number of entries in the extent data structure. FIG. 6 illustrates an implementation of an extent data structure 86, which is a list of free extent descriptors. The list illustrated in FIG. 6 is a doubly linked list with data on the first free sector and the amount free. Each element in the list comprises an ordered pair of the first free sector 87 and the number of free sectors 88.

An advantage of using the extent data structure is that it makes unnecessary data structures such as binary buddy systems and its derived optimizations. The extent data structure encapsulates all the spatial information needed for efficient retrieval of objects as well as the allocation and free state of the allocation bit map. The allocation process is only one pass over the extent data structure. If enough blocks to satisfy the request were not found during the pass, the process returns failure. Because of the extent data structure, the allocation bit map only gets examined when it needs to be updated. The allocation bit map is updated only when a committed set of allocation needs to be recorded. When needed, these updates can be optimized by batching them using a database notion of group commit that has also been exploited in file systems. The extent description elements can be used as a volatile deferred list used at transaction commit to actually reflect the allocations on the underlying space bit map.

To avoid fragmentations in the extent data structure, a recommended operation is using a low watermark sector value to allocate sectors from that value onwards. This allows deletions to not interfere with compact assignment of blocks. The low watermark block value is made to rotate cyclically through all block values. Having an offline storage reclamation procedure that strives to compact the set of allocated bits in the allocation bit map also aides in reducing fragmentation and in keeping manageable the size of the extent data structure. By keeping a small set of pointers into the structure, for example, 16 pointers, de-allocation can be made quite efficiently. The difficulty lies not only in inserting an element into the structure, but in determining if there are immediate neighbors that need to be combined because they represent one extent. Keeping consistent the set of pointers into the structure can be achieved by using a special mark in those elements being represented in the list of pointers. An example of such a mark that does not require additional space at the cost of additional computation is using a negative number of sectors to denote the length of an extent.

Prior to performing the storage allocation process, a determination is made of the storage transfer unit of the device that guarantees a performance value for large objects.

For each kind of storage media, there is a size threshold beyond which the maximum data rate of storage and retrieval can not be achieved. Some hardware devices require repositioning to service a storage or retrieval request. The size threshold can be used as the size of object fragments to be manipulated in their entirety by the storage management system. When the size of an object is larger than the size threshold, the storage system treats the object as a set of objects of that size where possibly one of them would be smaller.

Given the distribution of static sizes of objects and the distribution of sizes of client requests, considering the size threshold as the size of the object fragments to be manipulated in their entirety can lead to excess internal fragmentation of the storage medium. A smaller unit is preferably used as the fragment size. This smaller unit represents a space/time tradeoff and is a measure of data non-alignment that helps reduce internal fragmentation of storage media at the possible cost of higher access time for an object. The geometric characteristics of the storage media are represented by and encapsulated in this fragment size or performance threshold value. For magnetic and optical disks, for example, this threshold allows control of the maximum number of head seeks that will be encountered while retrieving an extent of blocks. In multi-platter disks, a head is changed by either switching to a head in the same track but on a different platter or by changing to a different track. Moving the heads to a different track is the most expensive operation as it takes several milliseconds. One such repositioning occurs per threshold many sectors; and, at most, one may occur between two sets of threshold many blocks. Minimizing the number of head seeks is the most important factor to realize the full potential of the maximum transfer bandwidth of a disk device. Thus, if the threshold is set to be a track of a magnetic disk, the maximum number of head seeks needed to retrieve an object is bounded by the number of elements in the stack used to satisfy the corresponding allocation request. If the threshold is set to half a track, then the number of seeks is bound by twice the number of elements in the stack. The upper bound of the number of seeks needed to retrieve an object from the storage system can be recorded in the storage system metadata and can be used by storage systems to estimate retrieval times for objects.

When the storage management process receives a request to allocate M blocks of storage for an object or set of objects, and M is larger than the threshold, the process allocates the blocks by trying to use sets of contiguous blocks of the size of this threshold. When the total size of the requested blocks is less than the threshold value, the process tries to find contiguous blocks to satisfy the request. In that way, the number of hardware repositions can be minimized when servicing a retrieval request, thus striving to maximize the speed at which an object can be retrieved.

The choice for the performance threshold determines how aligned the data is placed on the devices. The performance threshold is selected heuristically depending on the requirements of retrieval throughput of the applications and the desired degree of utilization of the device. When the value of this threshold is large, after use of the system for a while, the system becomes fragmented such that requests for blocks of a certain size would be routinely denied. In the preferred embodiment, this threshold is set to the size of a track divided by two and rounded to an integer value. This value aligns the data in such a way that, at most, twice the minimum number of hardware repositions or changes to the reading head are needed to retrieve an entity in the system.

In the example shown of the bit map in FIG. 5 and assuming a threshold of two blocks for the underlying device, a request for four blocks would return a stack with two elements. The one element would be for the ordered pairs (4,2) (9,2). A request for five blocks would return an empty stack in spite of the fact that there were six blocks still available in the device. This occurs because at the end of the pass over this structure, there would only have been found a total of four blocks on behalf of this request for the threshold for the device.

In the process that has been described, the client can send the server a list of a set of the objects and their sizes to be stored instead of the actual set of objects. The server plans the complete space allocation and then requests on demand transference of the set of objects from the client. The list of objects would preferably include all pertinent metadata including space requirements.

With the described invention, the storage management system is free to use any available compression technology to reduce the space requirements of the objects it stores. The process provided exploits the ability of the server to compress the objects of the clients. Compression can benefit allocation in two ways. The first way is allowing the system to request less blocks to be allocated. The second benefit is not needing to use all the requested blocks. The storage management process described is able to return to the structure those extents that aren't needed as a result of the compression without examining the allocation bit map. In that way, when the effects of compression cannot be estimated and when the compressed data is not available before the space allocation request is made, the system will request an amount of storage that will probably exceed what will actually be needed. Those block extents not used are returned efficiently to the structure.

In the same way that the server can compress that data when needed, the server may also encrypt the data when efficient. Encryption keys may be private to the administrator of the server. The keys may be under the control of the client or the keys may belong to a third party. The point is that the storage management system allows encryption at the server without need for explicit intervention by the client other than at most specifying the encryption keys to be used.

While the preferred embodiment of the present invention has been illustrated in detail, it should be apparent to one skilled in the art that modifications and adaptations to that environment may occur without departing from the scope of the present invention.

We claim:

1. In a storage system having a central processing unit (CPU), memory and at least one storage device wherein data objects are stored in a plurality of storage units on the storage device having unused storage units interspersed with the storage units containing data objects, a method for allocating unused storage units for an object set of a plurality of related data objects, comprising the steps performed by the CPU of:

(a) aggregating in memory for transference together to the storage device, at least two data objects from the object set that are of a size smaller than an optimal minimum storage size for transferring data objects to and from the storage device as determined for the storage system, into at least one object grouping of a size equal to or smaller than the optimal minimum storage size for the storage system;

(b) determining the total number of storage units needed for each object grouping and each data object, larger than the optimal minimum storage size, in the object set not in an object grouping;

(c) identifying the location and size of one or more extents of unused storage units between storage units containing data objects, of a size at least equal to the optimal minimum storage size, for storing each object grouping and each data object in the object set not in an object grouping; and (d) storing each object grouping and each data object in the object set not in an object grouping in the identified extents of a size at least equal to the optimal minimum storage size, so that the related data objects of the object set are stored as contiguously as possible for more efficient retrieval of the related data objects, and wherein all data objects in an object grouping are transferred together to the storage device for more efficient transference.

2. The method of claim 1 wherein one or more data objects are aggregated into an object grouping by performing the steps of:

(a) for each data object in the object set smaller than the optimal minimum storage size, storing the data object in a buffer the size of the optimal minimum storage size; and (b) when a data object in the object set smaller than the optimal minimum storage size will not fit in a used buffer containing one or more other data objects, storing the object in a refreshed buffer, wherein the group of one or more objects in the used buffer are an object grouping.

3. The method of claim 1 wherein the extents of unused storage units for storing data objects of an object set are identified by performing the step of:

traversing a listing of location identifiers and sizes of extents of unused storage units interspersed between storage units containing data objects once in a predetermined order while identifying unused extents of a size at least equal to the optimal minimum storage size until the total number of storage units needed for storing all data objects in the object set are identified or the listing ends.

4. The method of claim 3 wherein the listing of identifiers and sizes of extents of unused storage units is created by performing the steps of:

(a) creating a bit map representation of the storage units of the storage device;

(b) creating a linked list grouping extents based on the bit map representation wherein the linked list is the listing of identifiers and sizes of extents of unused storage units; and (c) updating the linked list as storage units are used and freed.

5. The method of claim 1 wherein the storage system comprises a server system in communication with a plurality of client systems.

6. The storage systems of claim 5 wherein the minimum storage size is determined as a factor of the object size and the storage device characteristics.

7. In a storage system comprising a server in communication with a plurality of clients, having a central processing unit (CPU), memory and at least one storage device wherein data objects are stored in one or more blocks on the storage device, a method for allocating unused blocks interspersed between used blocks on the storage device for an object set of at least one data object comprising the steps performed by the CPU of:

(a) for each data object in the object set determining whether the data object fits in a buffer the size of an optimal minimum storage size for transferring data objects to and from the storage devices as determined for the storage system;

(b) storing in the buffer data objects that fit in the buffer;

(c) when a data object smaller than the buffer size does not fit in the buffer, requesting an identified extent of unused blocks on the storage device for the data objects in the buffer, and storing the data object smaller than the buffer size that does not fit in the buffer in the buffer after the data objects in the buffer have been stored in an identified extent of unused blocks on the storage device;

(d) for each data object larger than the buffer size, requesting an identified extent of unused blocks on the storage devices for the total number of blocks needed for storage of the data object larger than the buffer size; and (e) only storing data objects of an object set on the storage device when a sufficient number of extents of unused blocks are identified to store all of the data objects of the object set.

8. The method of claim 7 further comprising the step of a client requestor sending a list of objects to be stored to the server.

9. The method of claim 7 further comprising the step of notifying a requestor when an object cannot be stored.

10. The method of claim 7 further comprising the steps of:

representing each block of the storage device by a bit in a bit map; and using the bit map representation to create an extent list, wherein the extent list comprises a plurality of pairs of values for the first unused block address and the number of contiguous unused blocks.

11. A storage allocation system for allocating storage for at least one object set of a plurality of objects in a computerized storage system having a central processing unit (CPU), memory and a storage device comprising:

aggregating means for aggregating into at least one object grouping stored in a buffer in memory for transference together to the storage device, a plurality of objects from the object set that are smaller than an optimal minimum storage size for transferring objects to and from the storage device as determined for the storage system, the object grouping being at most the size of the optimal minimum storage size wherein objects from one object set are stored together in an object grouping separate from objects from another object set;

means for determining a total number of storage units needed for each object grouping and each object in the object set not in an object grouping;

identification means for identifying a set of one or more extents of unused storage units in the storage device interspersed between storage units containing objects, wherein each identified extent is larger than the optimal minimum storage size and the size of the set of one or more extents equals the total number of storage units needed; and means for storing each object grouping and each object not in an object grouping in the identified extents, so that objects in an object set are stored as contiguously as possible, and such that all objects in an object grouping are transferred together to the storage device.

12. The system of claim 11 wherein said aggregating means comprises:

a buffer, wherein the the optimal minimum storage size represents an upper fragmentation limit as determined for the storage system, which is a factor of a minimum allocation unit for the storage device;

means for determining whether an object fits into said buffer; and means for storing an object in said buffer.

13. An article of manufacture for use in a computer system for storing an object set of a plurality of data objects in a plurality of storage units on a storage device having unused storage units interspersed with storage units containing data objects, the computer system having means to write data objects to the storage devices, said article of manufacture comprising a computer-readable storage medium having a computer code embodied in said medium which may cause the computer to:

aggregate in a buffer for transference together to the storage device, at least two data objects from the object set that are of a size smaller than an optimal minimum storage size for transferring data objects to and from the storage devices as determined for the storage system, into at least one object grouping of a size equal to or smaller than the optimal minimum storage size for the storage system;

determine the total number of storage units needed for each object grouping and each data object, larger than the optimal minimum storage size, in the object set not in an object grouping;

identify the location and size of one or more extents of unused storage units between storage units containing data objects, of a size at least equal to the optimal minimum storage size, for storing each object grouping and each data object in the object set not in an object grouping;

transfer all objects in an object grouping, as stored in the buffer, together to the one or more extents; and store each object grouping and each data object in the object set not in an object grouping in the identified extents of a size at least equal to the optimal minimum storage size, so that data objects in an object set are stored as contiguously as possible.

14. The article of manufacture of claim 13 wherein the computer program code embodied in the medium may cause the computer system to:

for each data object in the object set smaller than the optimal minimum storage size, store the data object in a buffer the size of the optimal minimum storage size; and when a data object in the object set smaller than the optimal minimum storage size will not fit in a used buffer containing one or more other data objects, store the object in a refreshed buffer, wherein the group of one or more objects in the used buffer are an object grouping.

15. The article of manufacture of claim 14 wherein the extents of unused storage units for storing data objects of an object set are identified by the computer program code embodied in said medium causing the computer to:

traverse a listing of location identifiers and sizes of extents of unused storage units between storage units containing data objects once in a predetermined order while identifying unused extents of a size at least equal to the optimal minimum storage size until the total number of storage units needed for storing all data objects in the object set are identified or the listing ends.

* * * * *